United States Patent [19]

Purple et al.

[11] Patent Number: 5,806,080

[45] Date of Patent: Sep. 8, 1998

[54] SYSTEM AND METHOD FOR IMPLEMETING CANVAS OBJECTS ON WINDOWING COMPUTER SYSTEMS

[75] Inventors: Lance Jeffrey Purple; Leigh Allen Williamson, both of Austin, Tex.; Ching-Yun Yang, Saratoga, Calif.

[73] Assignee: International Business Machines Corporation, Armonk, N.Y.

[21] Appl. No.: 665,175

[22] Filed: Jun. 14, 1996

[51] Int. Cl.[6] .................................................. G06F 17/22
[52] U.S. Cl. ...................... 707/515; 707/514; 707/516; 707/520; 707/521; 345/340
[58] Field of Search .................... 707/513, 514, 707/515, 516, 526, 901, 520, 521; 345/339, 340, 342, 346

[56] References Cited

U.S. PATENT DOCUMENTS

| | | |
|---|---|---|
| 5,339,390 | 8/1994 | Robertson et al. . |
| 5,348,659 | 9/1994 | Kunz et al. . |
| 5,408,602 | 4/1995 | Giokas et al. . |
| 5,446,842 | 8/1995 | Schaeffer et al . |
| 5,537,526 | 7/1996 | Anderson et al. ........................ 707/515 |
| 5,613,124 | 3/1997 | Atkinson et al. ........................ 345/433 |
| 5,651,108 | 7/1997 | Cain et al. .............................. 345/340 |
| 5,659,676 | 8/1997 | Redpath .................................. 707/515 |
| 5,664,208 | 9/1997 | Pavley et al. ........................... 707/515 |
| 5,669,005 | 9/1997 | Curbow et al. ......................... 707/523 |

*Primary Examiner*—Joseph H. Feild
*Assistant Examiner*—Stephen Hong
*Attorney, Agent, or Firm*—Robert M. Carwell

[57] ABSTRACT

A separate window is provided for each of multiple Open-Doc Canvas objects, thereby effecting a multiple Canvas-per-compound document design. Possibility of one Open-Doc object drawing in another object's screen area is eliminated by clipping imposed by the Xserver on a per-window basis. Multiple different X-rendering libraries may be employed for screen imaging. The raw XWindow may be used for direct Xlib drawing functions and other rendering toolkits. Widgets associated with alternative graphical user interfaces may be used as the root of a widget hierarchy.

26 Claims, 4 Drawing Sheets

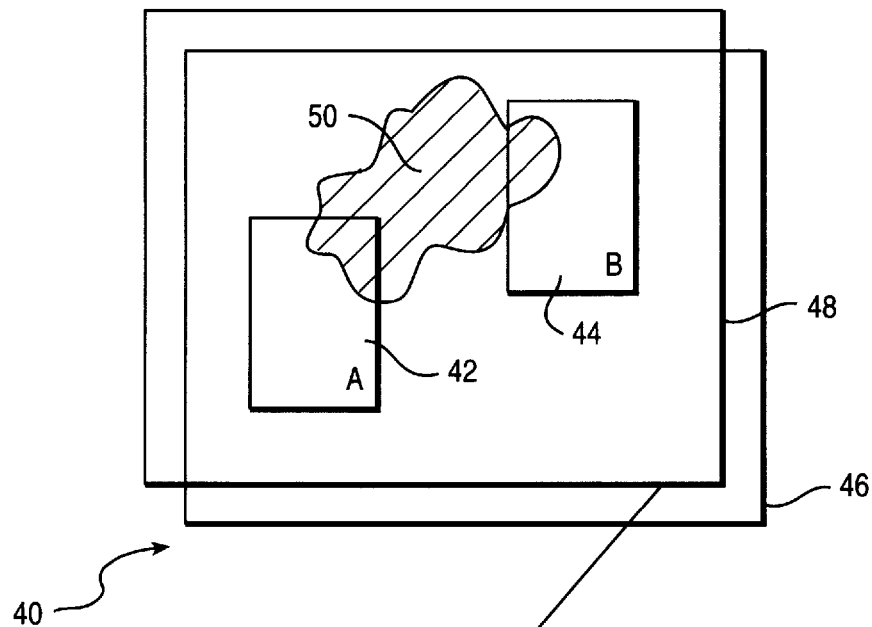
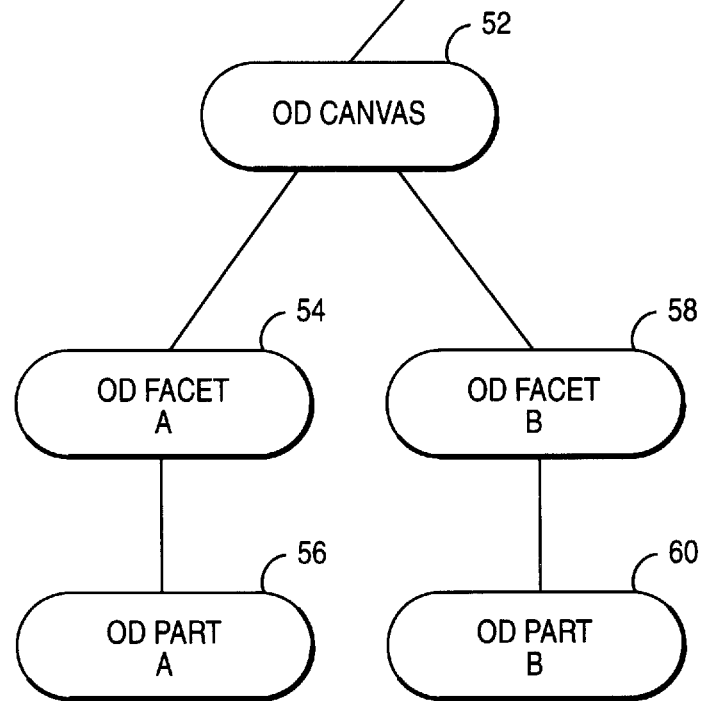
FIG. 2
PRIOR ART

SYSTEM AND METHOD FOR IMPLEMETING CANVAS OBJECTS ON WINDOWING COMPUTER SYSTEMS

TECHNICAL FIELD

This invention relates to computer systems employing graphical user interfaces and, more particularly, to such systems including multiple windows and mechanisms for controlling screen draws in allocated areas.

BACKGROUND OF THE INVENTION

In the early development of computer systems, the conventional user interface comprised a command line interface. In such a system a user provided input by means of instructions typed on a keyboard which appeared on a line on the user's video monitor. This form of user interface served quite well in the initial stages of development of the computer industry. This was because, at the time, users typically were computer operators or individuals with at least some computer training or technological expertise. Such individuals felt comfortable with the sometimes arcane syntax and semantics required by the then-current command line driven computer operating systems and software applications.

However, as the popularity of computer systems increased and use migrated downward to increasing numbers of individuals with little or no such training who often were mere casual users, the inherent weaknesses of such a command-line user interface became readily apparent.

In response to this problem, solutions began to appear attempting to avoid this command-line based form of interfacing with computer systems. Several forms of graphical user interfaces (GUI) thus became available which presented various choices, menus, icons, and the like to the user. The user was then able to interface with them by means of convenient pointing devices such as mouses, touchscreens, cursor keys, trackballs, etc. The syntax and semantics still required by the operating systems and applications were essentially made transparent to the end user and placed under the covers, thereby obviating the need for the user to be familiar with them.

Representative and very commonplace examples of such GUIs abound, including the familiar Macintosh operating system marketed by the Apple Computer Corporation and subsequently the Windows and OS/2 interfaces popularized by the Microsoft Computer Corporation and the IBM Corporation, respectively.

These GUI based interfaces represented a significant advancement over prior command-line interfaces and have enjoyed wide popularity. However, as the sophistication and versatility of modern computing systems continued to advance, significant inherent weaknesses in these systems even began to appear.

As an example, whereas previously users were content with standalone applications such as word processors, spreadsheets, and databases and utilized these applications and their resulting data independently of one another, it became increasing apparent that significant benefits could be derived from interaction between various applications and interchange of their data. With the increased popularity of graphics images (resulting from emergence of graphics design packages, improved computer image displays and processing, video capture cards, standardization of image files, and the general increase in popularity of multimedia) it became very desirable to be able to imbed graphics or an image in a text document. As the industry developed, various mechanisms were provided to facilitate this. Unfortunately, however, these methods were extremely clumsy and cumbersome and very difficult for the average user to employ easily and conveniently.

Typically suites of application programs were therefore developed, such as word processors and graphics/image packages, which permitted savings of data in a pre-specified format from one application which could thereafter be exported to the other application.

As an example, it is now commonplace to employ a word processing machine which can import images from within the word processor in various industry standard image formats such as .PCX, GIF, .BMP and the like. This capability to import data from a different application has even become available between applications which were not marketed as a suite from a single vendor.

Although the foregoing ability represented yet another advance, it nevertheless still was fraught with numerous drawbacks. What a user typically desired to be able to do was not only import data from another application, but to edit or modify this data from within the receiving application to which it was exported. However, current technology did not permit these differing applications to essentially be imbedded within the same environment and "talk" directly to each other. In other words, once a .GIF image for example was imported by a user into a word processor and perhaps text was then added around the imported image, the user frequently would desire to be able to edit the .GIF image from within the word processing application it was imported to. The user desired the ability to perform such editing just as the image previously would have been edited by a standalone Paint application for example. The end user in fact frequently might not even care what imaging application was providing the functionality under the covers to permit processing of the differing data types. However, in accordance with current technology, in order to effect such modification of an image, for example, it was necessary to do so outside the application and then re-import the image. This became extremely cumbersome and unworkable as should be readily apparent.

The foregoing difficulties gave rise to yet another advance in the computer field with the heightened awareness and interest in what is currently referred to as "document-centered computing". In this model, the notion of a compound document was developed and an associated framework or architecture for effecting this. Different software components providing the functionality of word processing, functions of a spreadsheet, image editing and display, etc. were made available which functionally could literally plug into one another in a modular fashion. In essence these differing predecessor differing standalone applications and their associated functionality were converted by this model into separate components which could be invoked by a single environment. The analogy has been made to the familiar modular stereo component systems, wherein the user may select speakers, amplifiers, tuners, turntables, CD players, etc. from differing manufacturers to essentially build a custom system. The user is nevertheless assured that the various components will operate together correctly because standardized interfaces between the components had been defined and implemented in the components by the various manufacturers.

The foregoing developments gave rise to one specific embodiment of this compound document framework known in the industry as "OpenDoc" (TM of Apple Computer, Inc).

This OpenDoc standard resulted from a consortium including the IBM Corporation, the Apple Computer Corporation, the Novell Corporation and others, and the specification or standard is currently maintained by the Component Integration Labs, Inc. Part of the purpose of this technology was in fact to define such interfaces in order to facilitate the combination in one environment of the various desired aspects of document-centered computing. This thereby freed the end user from having to consider what program to use to edit pictures for example. In an OpenDoc environment, the user could simply invoke from within a document any number of graphics packages, edit an image within the document with the package, save it, and read it back into text as desired without being concerned about format abilities and the like. Thus, now regardless of which document architecture became prevalent, the end user could nevertheless invoke a pulldown menu within such an OpenDoc environment, select at will an image to imbed and edit, and whatever under-the-covers software component was employed to create and edit the image and pull it into the word processing document would be attached to this image for use within a single environment. The modularity offered by this technology was extremely attractive both to developers as well as end users, resulting in, for example, yet another form of such compound document architecture known as "OLE".

It should be readily apparent that this current interest in document-centered computing has rendered obsolete the prior approach of providing standalone word processors for example which became bloated with code for accommodating various text formats, associated conversion routines, and the like. One important gain from moving away from this approach is that as these monolithic applications became so bloated, they typically also would become more bug prone, harder and costlier to maintain, package, and distribute. It should not be surprising then to see the move in the industry to break functions out into smaller software components. One additional significant benefit of this was that new data formats such as VRML, etc. could easily be accommodated as new software components inasmuch as the OpenDoc environment could simply handle them by imbedding the new component. The end user also benefited in that he or she was not faced with continually having to purchase to numerous standalone applications.

Although the OpenDoc system has become very useful, as evidenced by its implementation on numerous platforms such as the aforementioned Macintosh, Microsoft Windows, OS/2, and AIX operating systems (the latter two being marketed by the IBM Corporation), it too nevertheless became subject to several serious and inherent weaknesses which troubled the industry.

Implementations of the visual component of the OpenDoc system 40 of FIG. 2, have to date been for a screen 46 displaying a single top-level window 48 enclosing the OpenDoc environment. A highly significant characteristic (and drawback) of such OpenDoc implementations was that only a single OpenDoc "Canvas Object" was provided which all OpenDoc component objects or "Parts" would employ and draw onto. In order to better understand the subject invention it is perhaps helpful to understand some terms associated with OpenDoc. The term "Canvas Object" as utilized hereinafter is an important object which allows for cross-platform compatibility of the invention. An OpenDoc environment includes various libraries which wrap all of the differing system services. For example, there is a storage system object in the OpenDoc environment which permits Parts (to be hereinafter explained) to interact with the system in order to get data onto a disk. For portability and modularity it is important that these Parts not be concerned with the particular platform in which they are operating. Thus, an important function of the Canvas Object is to effectively provide a wrapper to wrap all these differing system services, e.g., to wrap whatever the particular system's representation of its rendering service, whether it be an XWindow, HDC (in the case of the Windows environment), or the like. It is thus essentially a level of indirection that encapsulates various functions.

Yet another term used herein is the aforementioned notion of an OpenDoc "Part" Object (also referred to herein as a component). These parts are essentially pieces of code which handle particular data formats and actually perform the various operations to generate and modify the specific information associated with areas or "Facets" of a screen and the related images.

In the prior art implementation of OpenDoc as shown in FIG. 2, one and only one OpenDoc Canvas Object, 52, was provided per each window 48 which typically represented a compound document. Each and every OpenDoc Part, such as parts 56, 60 in FIG. 2 invoked the same single OpenDoc Canvas Object 52, which the respective Parts drew onto.

A serious drawback of the thus-described OpenDoc design was that it was necessary for each individual Part 56 or 60 to apply its own transformations and clipping supplied by its parent. Otherwise, the particular OpenDoc Part could potentially draw into an area of the screen which was not allocated to it. Referring again to FIG. 2, a representative such area 50 of the screen may be seen which has been erroneously drawn onto by a corresponding Part due to an improper application of such transformations and clipping.

More particularly, as will be hereinafter described, each Part will have associated with it a corresponding Facet which defines an area of the screen 46 which the corresponding Part is to draw to. Thus, for example, referring in more detail to FIG. 2, an area "A" shown at reference numeral 42 is defined by the Facet A, 54, which, at least in theory, is the predefined area to which the Part A, 56, is to draw to. In like manner, a physical geographic area "B" shown at reference numeral 44 on window 48 is a predefined area on the window 48 defined by Facet B, 58, and is intended, in theory, as the only area of the window 48 in which the Part B, 60, will be permitted to draw to.

The problem with prior technology arises that if Part A, 56, issues a drawing command erroneously extending beyond its allocated screen space defined by the Facet A and the area A shown in the window 48, there is nothing to preclude the erroneous drawing outside the area A and into the crosshatched area 50. Thus, in the prior technology, each Part was depended upon to essentially have perfect rendering code with no bugs which might result in execution of a drawing command to the system to effect drawing outside of its corresponding boundary and into region 50. In essence, the problem was that each Part was not provided with any enforcement (notwithstanding that in fact pre-defined shapes or areas A, B were in fact defined by the corresponding Facets 54, 56.

In summary, unfortunately, because of the inadequacies of the prior OpenDoc design, there was simply no way programmatically to check for such incorrect drawing into unallocated screen areas. This has remained as a serious source of development problems until the advent of the subject invention for essentially all platforms which have implemented the OpenDoc solution to date, including those of the Macintosh, Microsoft Windows, OS/2, and AIX operating systems. Certainly Parts could have been laboriously hardcoded in a manner to provide such checking. However, there has heretofore been no practical and reliable way to provide checking for this inappropriate drawing in an efficient manner.

Yet another problem presented by prior systems relates to the borders for Parts required by OpenDoc systems. Such borders may be seen in FIG. 2 as the outer lines defining the rectangular regions A and B. They may take the form of "active" borders as well as "selected" borders having different appearances defined by the OpenDoc specification. Because of lack of enforcement and inability to invoke these borders at will by simple XWindow calls, it was also necessary in prior technology to effect these borders with burdensome and error-prone calculations and drawing calls.

In accordance with prior implementations of OpenDoc, in order to provide the effect of widgets for effecting various screen elements (scroll bars, push buttons, arrows and other user interface screen objects), this also entailed laborious calculations and numerous low level drawings calls to ensure that these elements were appropriately bounded since the enforcement provided by the invention was not present. However, notwithstanding the increased performance of systems and associated processors and hardware, these numerous calculations and calls became unduly burdensome on graphical user interface-based systems, seriously impairing their performance and quality regarding OpenDoc Parts which are rendering and providing border displays.

Yet another problem was associated with prior OpenDoc and other compound document implementations. Various rendering toolkits have become available to provide a rich range of graphics functionality such as OpenGL, PEX, etc., which provide such function as 3D libraries and the like. Third party vendors have often solved difficult rendering problems which are then packaged and sold as these toolkits and which others may make calls to in order to solve various graphics rendering problems. However one problem associated with these toolkits is that in their operation it is assumed that they have access to an entire Canvas. As heretofore noted with reference to FIG. 2, the prior art had dedicated a single Canvas 52 to the entire window area 48. Accordingly, prior to the subject invention, use of such toolkits would result in ill-behaved software component Parts, inasmuch as they would thereby have no notion of the limited screen space afforded by the present invention in dedicating separate Canvases to predefined sub-areas of the screen. Thus the user ran the risk of such toolkits writing into screen areas which were never intended.

SUMMARY OF THE INVENTION

The hierarchical window structure and X server clipping functionality of the X window system is leveraged in a novel compound document implementation to avoid prior problems associated with previous OpenDoc Canvas Object implementations which heretofore gave rise to OpenDoc Parts drawing in screen areas not allocated to the corresponding Parts, and other related problems. The internals of the OpenDoc Canvas Object are restructured while maintaining the same interface definition for multiple platforms including Macintosh, Microsoft Windows, OS/2, and AIX, taking advantage of the object-oriented basis of the OpenDoc system being implemented on top of a system object model (SOM) in the C++ language.

In accordance with a representative preferred embodiment (the AIX operating system platform) when an OpenDoc Part is allocated a Facet defining an area of a screen for drawing, the system of the invention creates a distinct Canvas Object uniquely for this identical screen area. The Canvas Object defines the same size, shape, and location area as the area of the screen allocated for the OpenDoc Part as defined by its Facet. Accordingly, when the Part retrieves a Canvas Object upon which to effect a screen draw, the Part receives a separate XWindow for each location of the screen allocated to the Part.

Clipping is imposed at the server level of the XWindow system. Accordingly, each OpenDoc Part is precluded from drawing onto an area of the screen not allocated to the particular Part, thereby effecting enforcement of its boundary. Support is provided in the operating system of the preferred embodiment for the X11 Shaped Window Extension, whereby nonrectangularly-shaped areas are also correctly clipped.

With respect to active and selected borders for Parts required by the OpenDoc system, a child window is created under the Canvas Object to thereby implement such active and selected borders for Parts. Such child window automatically assumes the identical shape as the screen area allocated to the corresponding Part. Moreover, these border widgets are thence made visible and invisible with a single XWindow call, thereby providing faster performance and avoiding extensive calculations and drawings calls heretofore necessitated on other platforms and implementations of the OpenDoc system.

In accordance with the foregoing, a system is implemented wherein separate windows are provided for each OpenDoc Canvas object, thereby effecting a multiple Canvas-per-compound document design. Accordingly, performance and quality of OpenDoc Parts are enhanced with regard to rendering and border display. Possibility of one OpenDoc object drawing in another object's screen area is eliminated inasmuch as clipping is imposed by the Xserver on a per-window basis. Moreover, the preferred embodiment permits multiple different X-rendering libraries to be employed for screen imaging. The raw XWindow may be used for direct Xlib drawing functions and other rendering toolkits. Widgets associated with alternative graphical user interfaces such as Motif drawing area widgets may be used as the root of a widget hierarchy if, for example, Motif is being used for the user interface.

BRIEF DESCRIPTION OF THE DRAWINGS

FIG. 2 is an graphical illustration of a prior implementation of a compound document architecture and system wherein only a single Canvas Object is provided for each compound document, further illustrating use of this single OpenDoc Canvas Object by multiple OpenDoc Part objects.

DETAILED DESCRIPTION OF THE PREFERRED EMBODIMENT

Figure 1:
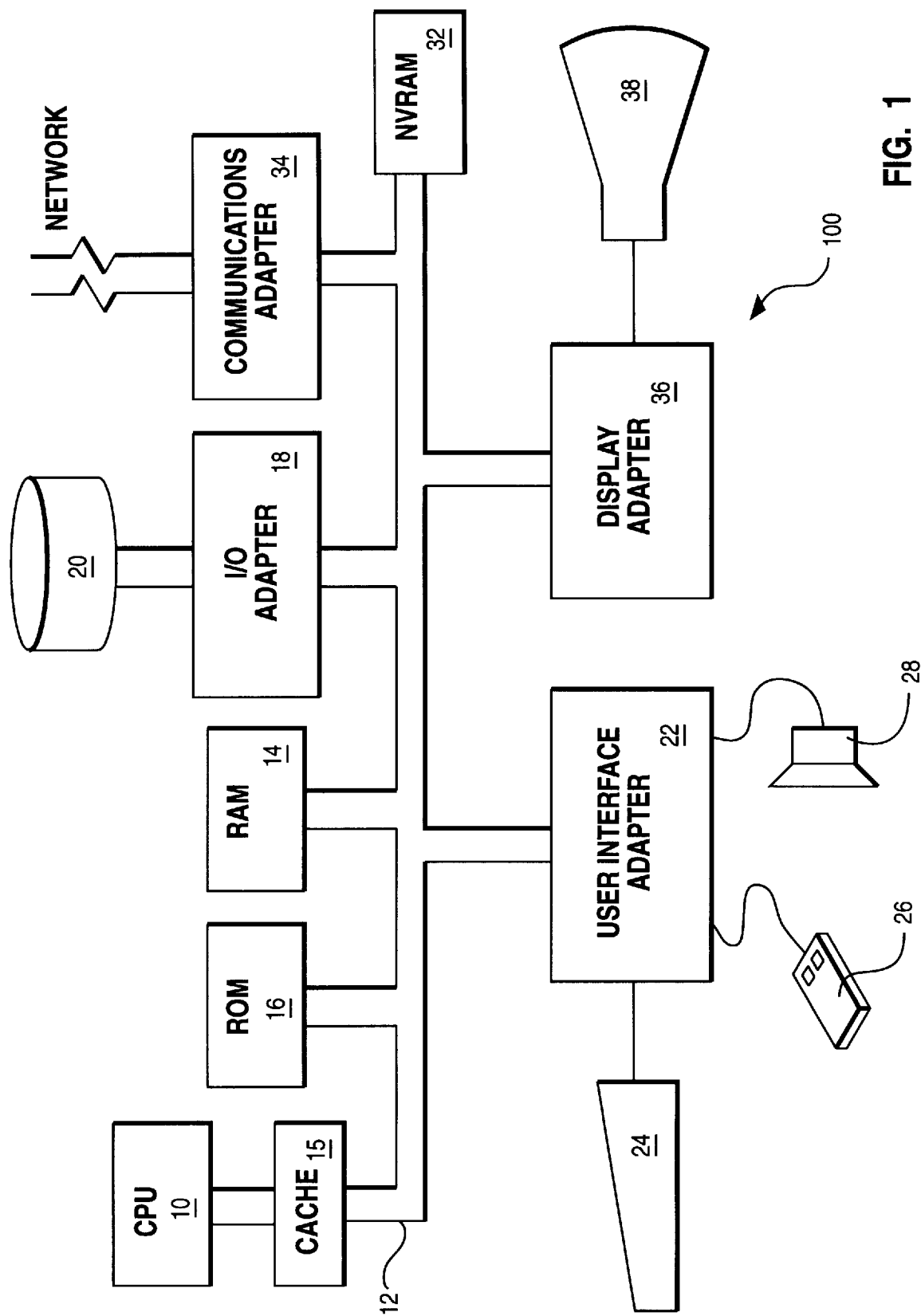
FIG. 1 is a functional block diagram illustrating a representative computer system in which the invention may be advantageously employed.

First a description of a representative computer system in which the invention may be advantageously employed will be provided with reference to FIG. 1. This will be followed by a general description of the invention and a more specific description with reference to FIG. 3 and the accompany flow diagram of FIG. 4.

The preferred embodiments may be practiced in any suitable hardware configuration that uses a touchscreen, such as computing system 100 illustrated in FIG. 1 or, alternatively, in a laptop or notepad computing system. Computing system 100 includes any suitable central processing unit 10, such as a standard microprocessor, and any number of other objects interconnected via system bus 12. For purposes of illustration, computing system 100 includes memory, such as read only memory (ROM) 16, random access memory (RAM) 14, and peripheral memory devices (e.g., disk or tape drives 20) connected to system bus 12 via I/O adapter 18. Computing system 100 further includes a touchscreen display adapter 36 for connecting system bus 12 to a conventional touchscreen display device 38. Also, user interface adapter 22 could connect system bus 12 to other user controls, such as keyboard 24, speaker 28, mouse 26, and a touchpad 32 (not shown).

A graphical user interface (GUI) and operating system (OS) of the preferred embodiment reside within a computer-readable media and contain a touchscreen device driver that allows one or more users a user to initiate the manipulation of displayed object icons and text on a touchscreen display device. Any suitable computer-readable media may retain the GUI and operating system, such as ROM 16, RAM 14, disk and/or tape drive 20 (e.g., magnetic diskette, magnetic tape, CD-ROM, optical disk, or other suitable storage media).

In the preferred embodiment, a desktop GUI interfaces the user to the AIX™ operating system. The GUI may be viewed as being incorporated and embedded within the operating system. Alternatively, other suitable operating system or desktop environment could be utilized. Examples of other GUIs and/or operating systems include X11™ (X Windows) graphical user interface, Apple's Macintosh™ operating system, Microsoft's Windows 95™ operating system, and the OS/2™ Operating System of IBM.

Figure 3:
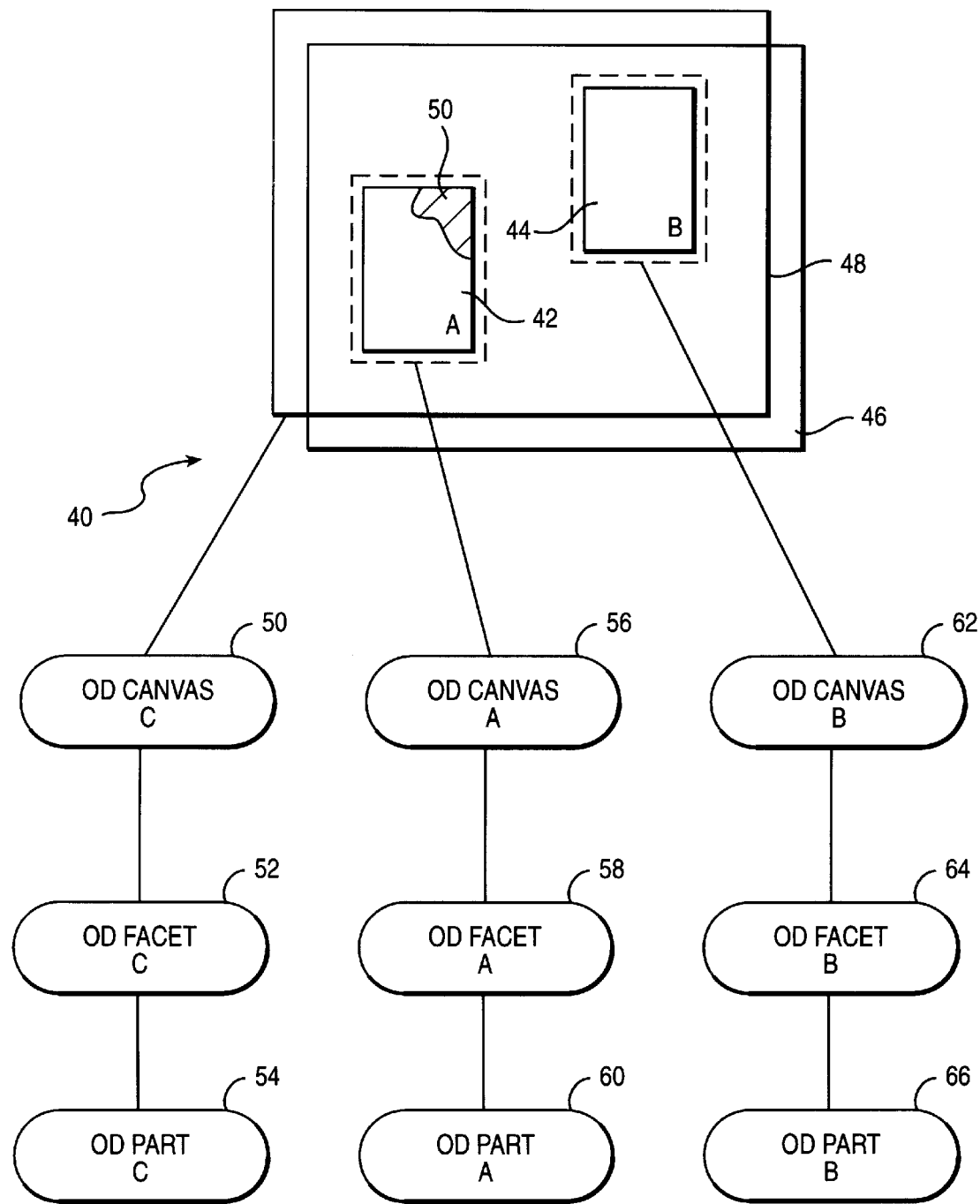
FIG. 3 is an illustration of an implementation of the compound document architecture and system of the invention providing multiple Canvas Objects for a compound document each associated with a respective Part.

Turning now to FIG. 3, in comparing this figure with that of the prior art of FIG. 2 it will be noted significantly that in FIG. 2 a single Canvas Object 52 is provided in comparison with multiple Canvas Objects 50, 56, 62 in FIG. 3. In the illustration of the invention in FIG. 3, it should be apparent that a Canvas Object of the invention is not intended to be a global object handling the entire screen 48 as in the case of FIG. 2, but rather a plurality of Canvases is employed. Thus, the invention may be seen to have instantiated a separate Canvas Object 50, 56, 62 for each corresponding Facet 52, 58, 64. The OpenDoc Canvas A 56 of the invention has associated with it an OpenDoc Facet A 58 defining the area "A", reference numeral 42, and this "stack" of Canvas, Facet, and Part 56, 68, 60 is uniquely associated with the window 42, with Facet A, 58, uniquely defining this area.

In like manner, the OpenDoc Canvas B 62, Facet B, 64, and Part B, 66, are uniquely defined and associated with the area "B", reference numeral 44 with the Facet B defining, in like manner, the size, shape, and location of this second window.

Finally, and similarly, the Canvas C, 50, Facet C, 52, and Part C, 54, stack is, in turn, uniquely associated with the area defined by the entire window 48.

By providing for such multiple Canvases with corresponding Facets and Parts, each uniquely associated with a particular portion of the screen 48, even if, for example, Part A, 60, has a bug in its rendering code which may otherwise absent the invention have resulted in a call to the system and drawing outside of the region A (as in fact happened in the illustration of FIG. 2), this eventuality is precluded with the architecture of the invention. In other words, such erroneous drawing is precluded from occurring on other locations on the window 48, and in particular, in the Part B container 44. The reason is that the bounds of the Canvas A object are clipped. Thus, even identical code which might have resulted in the drawing outside of the boundary A of FIG. 2 will be precluded with the invention from causing drawing in any screen area other than the specific screen area allocated for that software component Part. It will be seen that the invention has thus provided a mechanism for enforcing physical screen locations of software component Parts whereas heretofore no such enforcement was provided.

Figure 4:
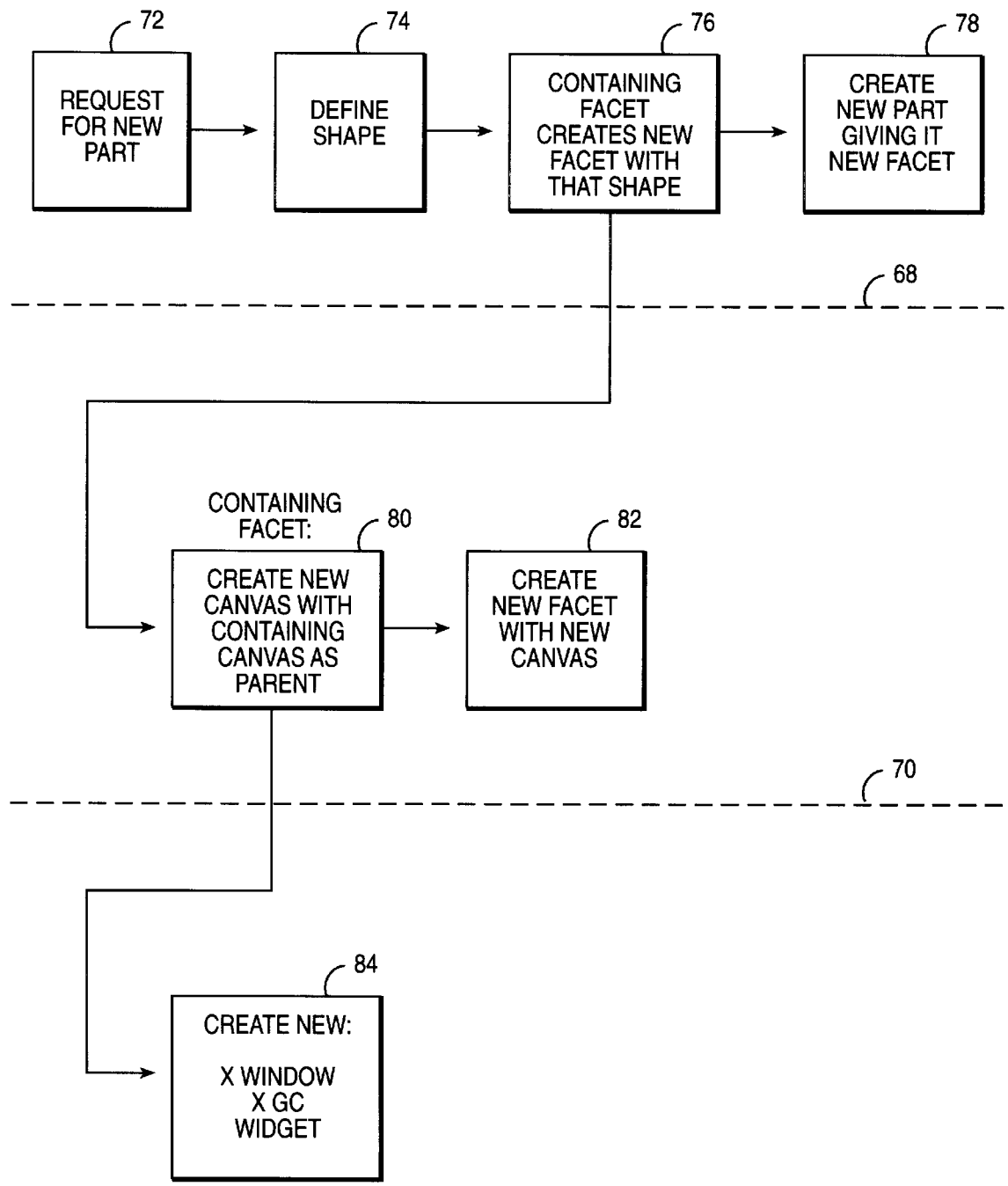
FIG. 4 is a flow diagram of program code for the system of the invention intended for execution in the system of FIG. 1.

Turning now to FIG. 4, a flow diagram is provided therein of one implementation of code for the compound document architecture of the invention which will yield the benefits of the invention when executed on a system such as that depicted in FIG. 1.

First, it will be assumed that a user interacting with the system has provided some input by means of a pointing device or the like which indicates the need to create a new OpenDoc component Part. This action might include dragging a piece of data into a window and dropping it, pulling down a menu item and instructing the system to imbed a graphics image or the like. The result of this action is for the system to request a new Part, 72.

Next, in response to this, the shape of such new Part will be defined, 74, by containing the Part where it is to be imbedded. This step will then be followed by a step in which a containing Facet (such as Facet "C", 52 of FIG. 3) creates a new Facet "A" 58, of FIG. 3, wherein this new Facet will have the same shape, size and location, (this step being shown at reference numeral 76 of FIG. 4). It will be noted from the dividing lines 68, 70 of FIG. 4 that these are intended to set off differing levels of detail of the steps described in FIG. 4. In other words, the operation of the invention at a high level may be understood with reference to the blocks above line 68, e.g., the flow from block 72-78. However, block 76 is thence described in greater detail in the blocks 80–82 between the dividing lines 68 and 70. Block 80 similarly is described in greater detail with reference to the more detailed description of its components in block 84.

In describing block 76 in more detail, as shown at block 80 a newly imbedded Canvas Object is created by employing the containing Facet Object "C" as the parent. This in turn causes the creation of the new Facet "A" which will now have associated with it the new Canvas "A", 82.

Finally, the block 84 below line 70 is intended to provide further detail as to the meaning in block 80 of creating a new Canvas. Specifically, the system employs system calls to create a new XWindow, XGC, and Motif widget, 84. In other words, internally this new Canvas A will interact with the system to interact with the system level structures allocated by the Xlib calls. These XWindow, XGC, and widget items may thus be seen to be new data contained by the new Canvas Object which were not held before.

In terms of the order of steps for creating a new stack, it will thereby be seen by reference to FIG. 4 that a new Canvas will be created followed by its corresponding Facet and Part. Cross referring from FIG. 4 to FIG. 3, the third step, 76, of creating a new Facet may be seen to essentially have been effected by the steps shown at 80, 82, 84. Whereas the prior technology provided for multiple Facet classes but only one Canvas class, the present invention has altered the object oriented connection between the Facet class and Canvas class hierarchy in order to allow for multiple stacks and their associated canvases.

From the foregoing it will be apparent that the OpenDoc Canvas internals have essentially been redesigned. Inspection of the interface definition for the new Canvas Objects of FIG. 3 would indicate that although both the Canvas Objects of FIGS. 2 and 3 would meet an identical Canvas Object specification (e.g., such as the Canvas specification for OpenDoc promulgated by the Object Management Group), the Canvas of FIG. 3 has essentially been extended by the invention to hold additional information.

It will be appreciated that each object in an object oriented architecture such as that of the instant invention has associated therewith a public interface such as an Interface Definition Language (IDL) in the case of the particular embodiment herein described. This IDL defines the permissible calls which may be made, the various services the objects provide, and the information they hold. Typically such an interface, as is the case with IDL, is programming-language neutral and will have a corresponding IDL defining the particular Canvas.

The IDL for the previous Canvases such as those of FIG. 2 might include three method calls or services exported as one piece of data D1, represented by the nomenclature M1, M2, M3, D1. Such an IDL for the novel Canvases of FIG. 3 in accordance with the invention would still comply completely with OMG or like standard for Canvases and thus would include the aforementioned M1, M2, M3, D1. However, because the Canvases of FIG. 3 are of novel form and are extensions, they may have additional method calls and data such as M4, M5, D2. As noted, such IDL will define what a particular Canvas object does and in the case of the Canvas objects of the present invention, the IDL may be defined as follows:

This is to be contrasted with the invention in which it is contemplated that by relying upon the XWindow system, a separate XWindow will be created with a shape corresponding to the area to be drawn in. It is a feature of the XWindow system to permit creation of clone windows with exactly the same shape, area and position as the parent window.

Thus, as an additional feature of the invention, it is contemplated to effect a cloning of the new Canvas created in accordance with the invention and a corresponding cloning of an associated XWindow. In this manner, this permits the system of the invention to make effectively one system call in order to clear out the contents of the area within the cloned XWindow, thereby yielding automatically a border with one system call.

Thus, it will be appreciated that in order to show or hide a border, it is only necessary to make one system call to either turn the XWindow clone on to see the border or a single call to shut down the XWindow clone in order to make the border disappear. This is to be contrasted with the foregoing description of the prior art in which case rendering borders visible or invisible became an extremely difficult matter of performing multiple calculations and numerous drawing calls, as is currently done on platforms not implementing the subject invention. The need to spend unnecessary CPU cycles in calculating the borders is thereby eliminated by effecting only one drawing call to make the border show up or disappear. This thereby provides performance improvements and the benefit of less code with the concomitant reduced likelihood of bugs.

It will be noted that in the OpenDoc implementation of a compound document framework, the notion of active and selected borders exists, each with a different appearance which must be supported in order to be compliant with the OpenDoc specification. It will be appreciated because of this, the above-noted problems noted with the prior art are further exacerbated by the need to provide two separate large

```
interface ODCanvas :   ODBaseCanvas
{
        void InitCanvas(  in ODGraphicsSystem graphicsSystem,
                          in ODPlatformCanvas platformCanvas,
                          in ODBoolean    isDynamic,
                          in ODBoolean    isOffscreen);
        Widget            GetCanvasWidget( in ODGraphicsSystem graphicsSystem );
        Window            GetCanvasXWindow ( in ODGraphicsSystem graphicsSystem );
        GC                GetCanvasGC( in ODGraphicsSystem graphicsSystem );
        Display*          GetCanvasDisplay( in ODGraphicsSystem graphicsSystem );
}
```

In addition to the IDL, in order to define and understand the operation of a particular Canvas object in the case of the invention, it is further necessary to understand how the Facets employ these extensions of the new Canvas objects which allow the multiple stacks to be built. The flow diagram of FIG. 4 previously described in fact provides such necessary detail as to how the facets employ these extensions provided by the new Canvas objects.

Now that the operation of the invention has been described, several benefits and added features which flow therefrom must be pointed out. It will be recalled that because, in prior technology, separate Canvas Objects were not provided for each screen draw area, in order to draw borders it was necessary to perform numerous complicated calculations and multiple function calls. These operations could become quite complex when it was necessary to draw dashed lines for example or, worse yet, to draw poly lines (necessary if the area to be drawn in was non-rectangular).

functions in order to calculate and draw not only one but two borders—a task which in accordance with the teachings of the invention may now be implemented simply by one function call for border widgets in order to make them appear or disappear as desired.

Additional aspects of the invention must also be referenced to step 84. The XWindow system permits several ways in which to place images on the screen area. One permissible method is to write low level Xlib calls invoking functions of the Xlib in order to perform desired graphics tasks with respect to desired pixels, such as providing cross hatching, etc. Clearly the invention contemplates employing this feature as desired inasmuch as an XWindow is created with respect to each Facet.

However, yet an additional method of effecting screen imagery is provided in the X system, namely the notion of high level composite image enhancements effected by widgets and, more particularly, a Motif or similar Toolkit (which include such things as screen elements including scroll bars, pushbuttons, arrows and other user interface screen objects all made into a composite). All one needs to do to effect one of these high level tools is to issue a single system call in order to have the particular effect rendered.

It is specifically contemplated by the invention to permit use of these items when desired to avoid the necessity for effecting drawings by low level Xlib calls as in the first-described manner. Thus, although use of low level "raw" Xlib calls is intended, it is further contemplated, as desired, that single function calls may be made to place a widget in as desired, for example, as a composite screen element. Numerous sources are available for these various toolkits such as the aforementioned OpenGL which is a set of library functions permitting the easy rendering of 3D images on XWindows.

It is an important function of the invention to permit use of the same libraries with the invention. Because the Canvas Objects of the invention each support a single XWindow, this XWindow may be employed with different rendering toolkit code. Whereas this may also be done in the prior implementations of OpenDoc and other compound document frameworks, there is an important aspect of the invention which renders use of these toolkits particularly beneficial in implementations of the invention. Such toolkits typically assume that their functions will have available to them the entirety of a Canvas area. It will therefore be readily appreciated that these functions will potentially be quite ill-behaved as software component Parts in prior implementations of compound document frameworks since they have no notion of limited screen space.

Thus, when such a function is called in the system of FIG. 2 for example, there is the potential that the resulting screen draws may extend in an undesired manner essentially anywhere on the screen. In contrast, and in keeping with the invention, these functions are boxed in to predefined areas defined by their corresponding Facets and associated Canvas Objects so as to preclude writing outside the desired component Part area.

While the invention has been shown and described with reference to particular embodiments thereof, it will be understood by those skilled in the art that the foregoing and other changes in form and detail may be made therein without departing from the spirit and scope of the invention.

What is claimed is:

1. A method for implementing compound documents in a graphical user interface-based computer system defining a screen area, comprising:
   detecting a request for a part;
   defining spatial characteristics of said part comprising a portion of said screened area;
   creating a facet corresponding to said characteristics wherein said step of creating a facet comprises:
   creating a canvas object; and
   wherein said step of creating with said facet is performed with said canvas object;
   detecting a request for a next part;
   defining spatial characteristics of said next part comprising a next portion of said screen area;
   creating a next facet corresponding to said step characteristics of said next part wherein said step of creating said next facet comprises:
   creating a next canvas object; and wherein said step of creating said next facet is performed with said next canvas object; and
   creating said part corresponding to said facet.

2. The method of claim 1 further including:
   retrieving said canvas object; and
   creating an x window in response to said retrieving said canvas object.

3. The method of claim 2 wherein said step of creating said canvas object further includes creating an xgc.

4. The method of claim 3 wherein said step of creating said canvas object further includes:
   creating at least one widget.

5. The method of claim 4 further including:
   retrieving said next canvas object; and
   creating a next x window in response to said retrieving said next canvas object.

6. The method of claim 1 wherein said spatial characteristics correspond to a specific area, shape, size, and location of said area on said screen.

7. The method of claim 6 wherein said canvas object corresponds to said specific area, shape, size, and location of said area on said screen.

8. The method of claim 5 further including:
   executing x server clipping of said window and said next x window.

9. The method of claim 1 wherein said part, said facet, and said canvas object are components of an opendoc system.

10. The method of claim 8 wherein said portion and said next portion of said screened area are non-rectangular; and
    said x server clipping is with x11 shaped extension clipping.

11. The method of claim 1 wherein said canvas object and said next canvas object correspond to a single one of said compound documents.

12. The method of claim 2 further including the steps of:
    creating a child x window of said x window under said canvas object;
    assigning to said child x window said portion of said screen area;
    assigning at least one border widget to said child x window; and
    altering border displays corresponding to said at least one border widget in said child x window in response to a single x system call.

13. A method for controlling screen draws to preselected areas of a visual display in a computer system, comprising:
    generating a plurality of canvas objects for one compound document, each of said canvas objects corresponding to a different area of said screen;
    extracting a different window pointer from each of said canvas objects;
    executing a screen draw on said display, including a plurality of windows, each associated with a said different area in response to said extracting; and
    bounding drawing in each of said windows during said screen draw with a corresponding different one of said canvas objects.

14. The method of claim 13 wherein each said corresponding different one of said canvas objects corresponds to a said different area of said screen.

15. Apparatus for implementing compound documents in a graphical user interface-based computer system defining a screen area, comprising:
    means for detecting a request for a part;
    means for defining spatial characteristics of said part comprising a portion of said screened area;
    means for creating a facet corresponding to said characteristics wherein said means for creating a facet comprises means for creating a canvas object; and wherein said creating said facet is performed with said canvas object;

means for defining a request for a next part;

means for defining spatial characteristics of said next part comprising a next portion of said screen area;

means for creating a next facet corresponding to said characteristics of said next part; and wherein said means for creating next said facet comprises:
means for creating a next canvas object; and wherein said creating said next facet is performed with said next canvas object; and means for creating said part corresponding to said facet.

16. The apparatus of claim 15 further including:

means for retrieving said canvas object, and means for creating an x window in response to said retrieving said canvas object.

17. The apparatus of claim 16 wherein said means for creating said canvas object further includes means for creating an xgc.

18. The apparatus of claim 17 wherein said means for creating said canvas object further includes:

means for creating at least one widget.

19. The apparatus of claim 17 further including:

means for retrieving said next canvas object; and means for creating a next x window in response to said retrieving said next canvas object.

20. The apparatus of claim 15 wherein said spatial characteristics correspond to a specific area, shape, size, and location of said area on said screen.

21. The apparatus of claim 15 wherein said canvas object corresponds to said specific area, shape, size, and location of said area on said screen.

22. The apparatus of claim 19 further including:

means for executing x server clipping of said window and said next x window.

23. The apparatus of claim 15 wherein said part, said facet, and said canvas object are components of an opendoc system.

24. The apparatus of claim 22 wherein said portion and said next portion of said screened area are non-rectangular; and said x server clipping is with x11 shaped extension clipping.

25. The apparatus of claim 15 wherein said canvas object and said next canvas object correspond to a single one of said compound documents.

26. The apparatus of claim 16 further including:

means for creating a child x window of said x window under said canvas object;

means for assigning to said child x window said portion of said screen area;

means for assigning at least one border widget to said child x window; and means for altering border displays corresponding to said at least one border widget in said child x window in response to a single x system call.

* * * * *

UNITED STATES PATENT AND TRADEMARK OFFICE
CERTIFICATE OF CORRECTION

PATENT NO : 5,806,080
DATED : Sept. 8, 1998
INVENTOR(S) : Purple et al

It is certified that error appears in the above-identified patent and that said Letters Patent is hereby corrected as shown below:

Column 13, line 4: change "defining" to --detecting--.

Signed and Sealed this

Twenty-third Day of March, 1999

Attest:

Q. TODD DICKINSON

Attesting Officer

Acting Commissioner of Patents and Trademarks